United States Patent [19]
Edwards

[11] 4,093,318
[45] June 6, 1978

[54] ENDLESS DRIVE SYSTEM

[76] Inventor: John W. Edwards, P.O. Box 1151, Brandon, Fla. 33511

[21] Appl. No.: 648,527

[22] Filed: Jan. 12, 1976

Related U.S. Application Data

[63] Continuation-in-part of Ser. No. 590,938, Jun. 27, 1975, abandoned, which is a continuation-in-part of Ser. No. 576,641, May 12, 1975, abandoned, which is a continuation-in-part of Ser. No. 532,698, Dec. 13, 1974, abandoned.

[51] Int. Cl.² .............................................. B62D 55/20
[52] U.S. Cl. ......................................... 305/11; 305/12; 305/34; 305/56; 305/57
[58] Field of Search .................................. 305/11-13, 305/27, 34, 32, 39-41, 43, 45, 50, 56, 57, 60, 10; 180/5 R, 9.44; 152/5, 6, 13, 17; 74/247, 250 R, 230.7

[56] References Cited

U.S. PATENT DOCUMENTS

| | | | |
|---|---|---|---|
| 296,998 | 4/1884 | Page | 180/9.44 |
| 905,405 | 12/1908 | Britton | 305/57 X |
| 1,217,007 | 2/1917 | Jory | 305/23 X |
| 1,420,531 | 6/1922 | Dutkiewicz et al. | 305/57 X |
| 1,789,084 | 1/1931 | Schwarz | 152/5 |
| 1,973,214 | 9/1934 | Lamb | 305/57 X |
| 1,975,726 | 10/1934 | Martinage | 305/57 X |
| 2,374,240 | 4/1935 | Shankman | 305/10 X |
| 2,900,210 | 8/1959 | Parsons | 305/12 |
| 3,606,497 | 9/1971 | Gilles | 74/230.7 X |
| 3,645,586 | 2/1972 | Piepho | 305/31 X |

Primary Examiner—Allen N. Knowles
Assistant Examiner—John P. Shannon
Attorney, Agent, or Firm—Beveridge, DeGrandi, Kline & Lunsford

[57] ABSTRACT

An endless drive system suitable for use as an endless belt, an endless chain drive or an endless track vehicle drive system. The endless drive system includes endless drive sections, with sloped sides to shed dirt or other foreign objects, and fasten pivotably connecting the endless drive sections. In preferred embodiments, shields are provided to prevent entry of dirt or other foreign objects. As an endless track vehicle drive system, the invention provides improved operation on soft surfaces and increased strength.

50 Claims, 35 Drawing Figures

ENDLESS DRIVE SYSTEM

This application is a continuation-in-part or U.S. Pat. application Ser. No. 590,938, filed June 27, 1975, and now abandoned. This application is a continuation-in-part of U.S. Pat. application Ser. No. 576,641, filed May 12, 1975 and now abandoned, which, in turn, is a continuation-in-part of U.S. Patent application Ser. No. 532,698 filed Dec. 13, 1974 and now abandoned.

The present invention pertains to an endless drive system. More particularly, the present invention pertains to an endless drive system suitable for use as an endless belt, an endless chain drive or an endless track vehicle drive system for tracked vehicles such as tanks and tractors.

Numerous types of vehicles are frequently used in terrain in which it is difficult for pneumatic tires to operate. Both military vehicles, such as tanks and amphibous vehicles, and civilian vehicles, such as tractors and recreational vehicles, are sometime utilized on terrains which are very soft, for example sand surfaces. Such sand surfaces might be encountered in various environments, for example, in citrus farming and military operations. Pneumatic tires are not capable of efficient operation on such sand surfaces, as they tend to burrow into the sand, rather than riding across the sand surface.

Endless track vehicles have been developed for use on terrains in which pneumatic-tired vehicles are impractical. U.S. Pat. Nos. 3,361,488 and 3,688,858 show such endless track vehicles. In many types of terrain these vehicles provide improved performance relative to the performance of pneumatic-tired vehicles; still, difficulties are encountered with existing endless track vehicles. One particular difficulty is that dirt from the terrain, for example sand, is picked up by the track system and deposited on the drive components. This reduces the efficiency of the vehicles and in extreme cases prevents operation altogether. Another difficulty is that the greatest stress is exerted on pins and bushings of existing endless track systems, causing rapid wear of these components.

Similarly, it is often desired to use endless belt systems and endless chain drive systems in environments which are dirty or otherwise unsatisfactory. Usage in such environments is difficult becaue dirt, including dust, sand, and mud, tends to accumulate and impede operation and because some components are particularly subject to wear.

The present invention is an improved endless drive system which minimizes the likelihood of accumulation of sand, dirt or other foreign objects, thereby minimizing the likelihood that such system will become inoperative due to an accumulation of such foreign objects. In addition, the endless drive system of the present invention distributes stresses over considerable area, thus reducing wear. The endless drive system of the present invention is thus suited for use as an endless belt, an endless chain drive, or an endless track vehicle drive system, particularly in environments which are sandy, dirty or otherwise difficult. In accordance with the present invention an endless drive system is provided including a plurality of endless drive sections each having a substantially flat contact surface and sloped side surfaces which distribute stress and which shed dirt and other foreign objects. Preferably, a shield is provided to prevent entry of foreign objects between the endless drive sections.

These and other aspects and advantages of the present invention are more apparent in the following detailed description and claims, particularly when considered in conjunction with the accompanying drawings in which like parts bear like reference numerals. In the drawings:

Each of FIGS. 26 and 27 is a sectional view depicting another embodiment of endless drive section in accordance with the present invention.

Each of FIGS. 29 and 30 is a sectional view depicting a further embodiment of endless drive section in accordance with the present invention.

Figure 1:
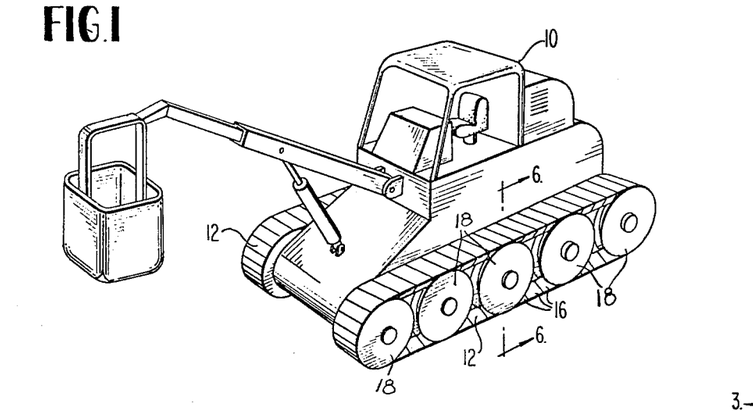
FIG. 1 is a perspective view of a vehicle incorporating an endless track vehicle drive system in accordance with the present invention.

In FIG. 1 endless track vehicle 10 includes on each side an endless track vehicle drive system 12 composed on a number of endless drive sections 16 and a number of wheels 18, one or more of which is driven to drive endless drive system 12 and so to propel vehicle 10.

Vehicle 10 includes the usual components, such as an engine or other power source, a transmission coupling the engine to one or more of the wheels 18, a brake system, and a steering system. In addition, vehicle 10 includes various working components such as agricultural components, military components, personnel carrying components, earth moving components, fruit harvesting components, etc. These details of vehicle 10 are well known in the art and are not a portion of the present invention, except insofar as they contribute to the overall endless trck vehicle.

Figures 2, 3, 4:
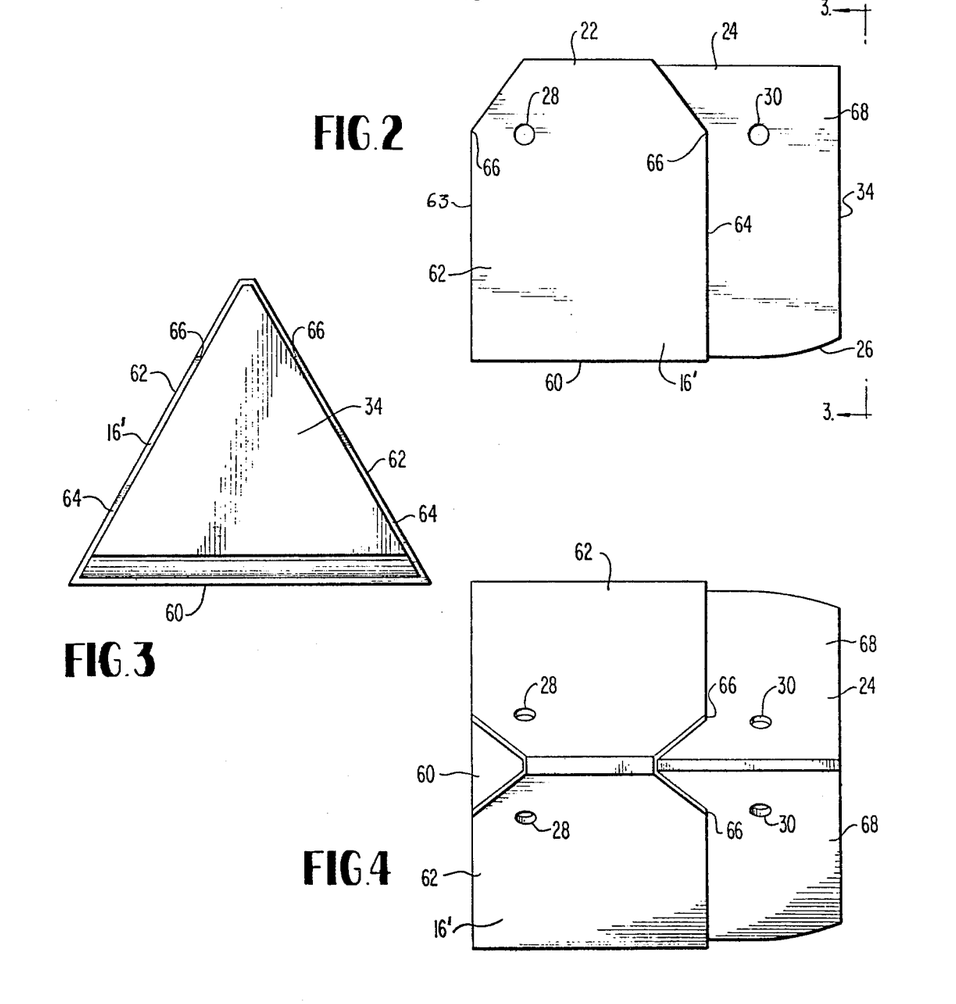
FIG. 2 is a side elevational view of a first embodiment of endless drive section suitable for incorporation into an endless drive system in accordance with the present invention.
FIG. 3 is an end elevational view of the endless drive section of FIG. 2 and is generally taken along the line 3—3 of FIG. 2.
FIG. 4 is a top plan view of the endless drive section of FIG. 2.

FIGS. 2, 3, and 4 depict a first embodiment of endless drive section 16' suitable for incorporation into endless drive system 12. Section 16' has a substantially triangular cross section, as can be seen particularly in FIG. 3. Section 16' includes a hollow triangular body portion 22, formed, for example, of a moderate gauge metal such as steel, and a shield portion 24 which also is triangular in cross-section and which, for example, may also be formed of a moderate gauge metal such as steel. Body portion 22 includes a substantially flat, rectangular contact surface 60 and sloped side surfaces 62. Each sloped side surface 62 is substantially rectangular except that each sloped edge 63 and 64 of each sloped side surface 62 angles inwardly at an angle of about 30° for a point 66 approximately two-thirds up the height of sloped side surface 62 from contact surface 60.

Shield portion 24 has triangular outer dimensions substantially equal to the triangular inner dimensions of body portion 22, and shield portion 24 extends from one edge of body portion 22, illustrated as extending from edge 64 in FIGS. 2, 3, and 4. Shield portion 24 extends from body portion 22 for a width in the order of about one-half the height of shield portion 24. Shield portion 24 has a curved lower corner 26. Preferably outer end surface 34 of shield portion 24 is closed to prevent sand, dirt, and other foreign objects from getting within drive section 16'.

Figure 5:
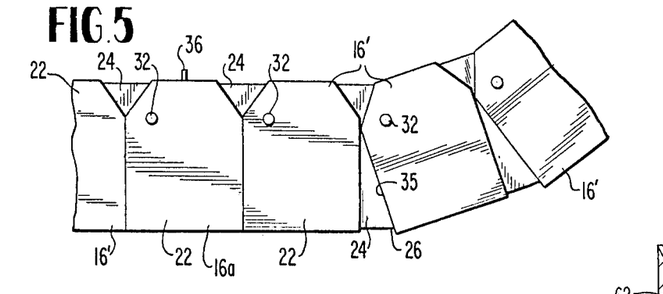
FIG. 5 is a schematic representation of a fragmentary portion of an endless drive system including endless drive sections in accordance with the present invention.

Each sloped side surface 62 of body portion 22 has an opening 28 therethrough near the upper outside corner thereof, adjacent edge 63. Likewise, each sloped surface 68 of shield portion 24 has an opening 30 therethrough. Opening 28 and 30 are at substantially the same distance above lower surface 60 and are positioned so that, as illustrated in FIG. 5, a series of endless drive sections 16' can be assembled to form an endless drive system 12 by inserting serting the body portion 22 of a first endless drive section 16' over the shield portion 24 of an adjacent endless drive section 16' and passing a fastener 32 through the aligned openings 28 and 30. As seen in FIG. 5, when connected in this manner, several endless drive sections 16' are capable of lying in a plane and of curving about a curvature such as the curvature of wheel 18. Likewise, the endless drive sections 16' making up an endless drive system 12 are capable of curving to conform to the curvature of the ground. In curving, the endless drive sections 16' which are raised rotate about their fasteners 32, with contacting surfaces 60 rotating about the curved corners 26 of the shield portions 24 of the adjacent endless drive sections 16'. Generally, sand, mud, dirt, or other foreign objects fall from the sloped side surfaces 62 of the body portions 22 or from sloped side surfaces 68 of shield portions 24. Preferably, edges 63 of each body portion 22 scrape dirt from sloped surfaces 68 of the shield portion 24 of the adjacent endless drive section 16' as the endless drive sections return to their planar orientation after passage about a wheel 18. Edges 63 can include replaceable wear surfaces for this purpose. Likewise, the edges of the contact surfaces 60 can scrape dirt from curved corners 26 and the lower surfaces of shield portions 24. Any foreign objects which may get into an endless drive section 16' fall to the ground out open end 35 as the endless drive section 16' rotates upwardly, as depicted in FIG. 5.

Figure 6:
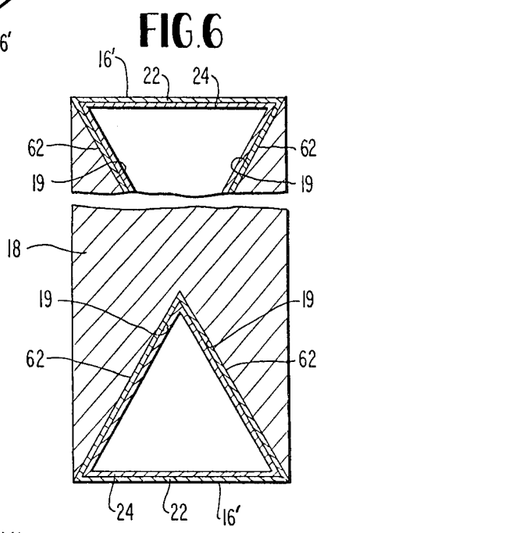
FIG. 6 is a fragmentary sectional view showing some of the details of construction of one embodiment of endless drive section in accordance with the present invention and is taken along the line 6—6 of FIG. 1.

FIG. 6 illustrates a wheel 18 with two endless drive sections 16' mated thereto. The periphery of wheel 18 includes a notch 19 to receive sloping side surfaces 62.

Figure 7:
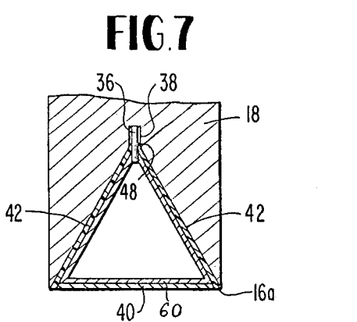
FIG. 7 is a fragmentary sectional view depicting a modified form of endless drive system in accordance with the present invention.

FIG. 7 depicts details of another embodiment of endless drive section in accordance with the present invention. Endless drive section 16a, shown in FIG. 7, is of the same essentially triangular cross-section as is endless drive section 16' in FIG. 2 through 6. Endless drive section 16a, however, includes a drive pin or slip-preventing pin 36 which extends upwardly from the corner junction 48 opposite contact surface 60. An endless drive section 16a with its drive pin 36 is also illustrated in FIG. 5. Drive pin 36 engages a recess 38 within wheel 18. Thus as wheel 18 is driven, endless drive section 16a is driven, causing the vehicle 10 to move, or as endless drive section 16a is driven, wheel 18 is driven. Alternatively, a drive pin or slip-preventing pin can extend outwardly from the inner extremity of notch 19 in wheel 18 to engage a recess in an endless drive section 16.

FIG. 7 also illustrates tread 40 on contact surface 60 of endless drive section 16a. For use as an endless track vehicle drive system, tread 40 can be cleated or ridged to provide increased traction. Likewise, FIG. 7 shows wear surfaces 42 on wheel 18 which contact endless drive section 16a. Wear surfaces 42 might be hard rubber surfaces utilized to reduce wear on wheel 18 and on endless drive sections 16a. When wear surfaces 42 have worn, they can be replaced without the necessity of replacing the entire wheel 18. Similar wear surfaces can be provided on the sloped side surfaces 62 of any of the endless drive sections 16, if desired.

Figure 8:
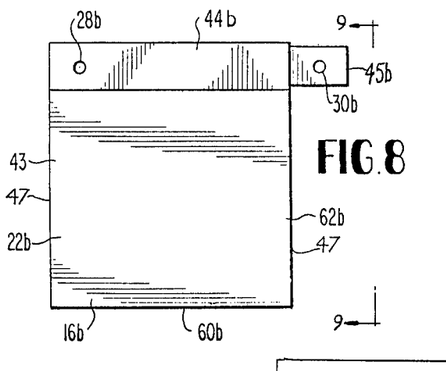
FIG. 8 is a side elevational view of another embodiment of endless drive section in accordance with the present invention.
Figure 9:
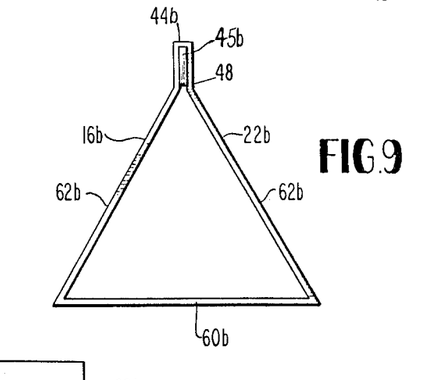
FIG. 9 is an end elevational view of the endless drive section of FIG. 8 and is generally taken along line 9—9 of FIG. 8.
Figure 10:
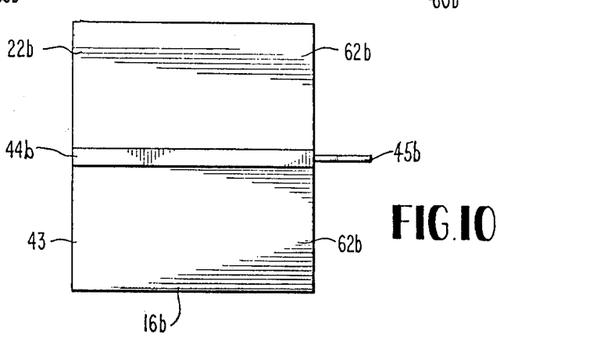
FIG. 10 is a top plan view of the endless drive section of FIG. 8.

FIGS. 8, 9, and 10 depict a further embodiment of endless drive section 16b in accordance with the present invention. Endless drive section 16b includes a first portion 22b which has a first segment 43 with a substantially triangular configuration including contact surface 60b and sloped side surfaces 62b, and a second segment 44b which extends upwardly from the corner junction 48 of triangular segment 43 opposite contact surface 60b. Endless drive section 16b further includes second portion 45b which extends from one end of second segment 44b and which mates with a recess in the opposite side of the second segment 44b of the mating endless drive section 22b. Opening 28b and 30b are provided in second segment 44b and second portion 45b, respectively, for fasteners to pivotably couple adjacent endless drive sections 16b. If desired, a tread surface, such as tread surface 40, can be provided on contact surface 60b of endless drive section 16b. Likewise, if desired, a drive pin or slip-preventing pin 36 can extend from second segment 44b to engage a slot in wheel 18, or second segment 44b can include a slot to receive a drive pin or slip-preventing pin extending from the wheel.

Figure 11:
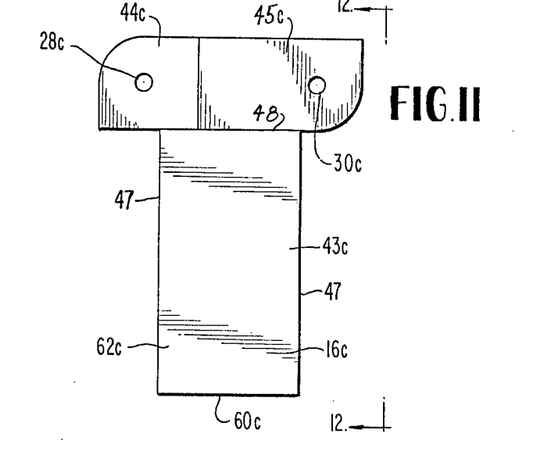
FIG. 11 is a side elevational view of a further embodiment of endless drive section in accordance with the present invention.
Figure 12:
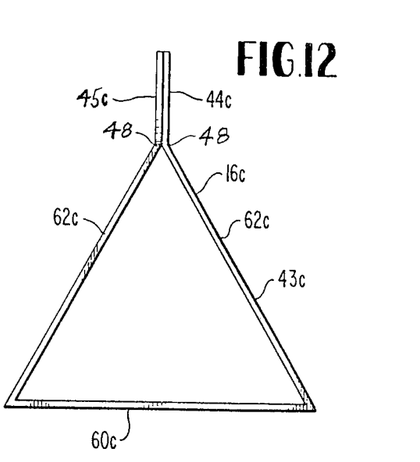
FIG. 12 is an end elevational view of the endless drive section of FIG. 11 and is generally taken along line 12—12 of FIG. 11.
Figure 13:
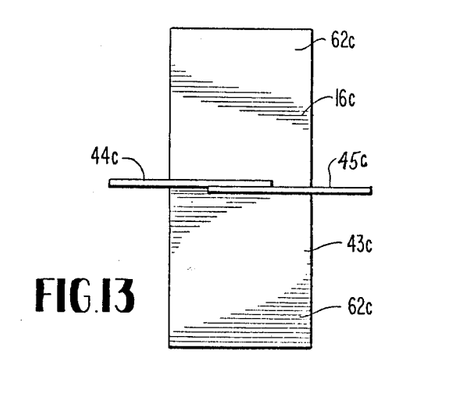
FIG. 13 is a top plan view of the endless drive section of FIG. 11.

FIGS. 11, 12 and 13 depict a further embodiment of endless drive section 16c in accordance with the present invention. Endless drive section 16c includes a first segment 43c, with a substantially triangular configuration including contact surface 60c and sloped side surfaces 62c. Second segment 44c extends upwardly from one side of the corner junction 48 of triangular segment 43c opposite contact surface 60c. Second segment 44c is offset from its associated sloping side surface 62c. Second portion 45c extends upwardly from the other side of the corner junction 48 of triangular segment 43c opposite contact surface 60. Second portion 45c is offset from its associated sloping side surface 62c, being offset in the direction opposite the direction of offset of second segment 44c. An opening 28c passes through second segment 44c, and an opening 30c passes through second portion 45c. When assembled into an endless drive system, the second portion 45c of one endless drive section 16c overlaps the second segment 44c of the adjacent endless drive section 16c, with openings 28c and 30c aligned for receipt of a fastener 32. Again, a tread surface and/or a drive pin or slip-preventing pin can be provided, if desired.

Figure 14:
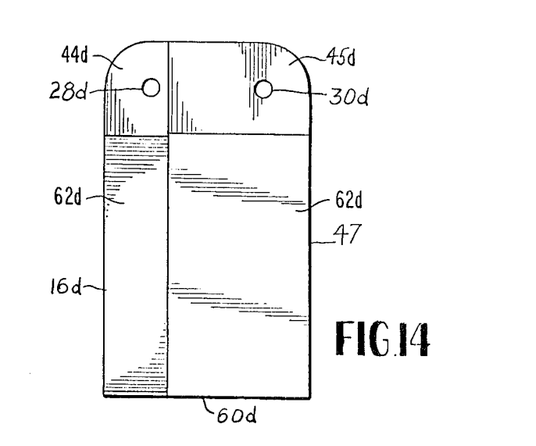
FIG. 14 is a side elevational view of yet another embodiment of endless drive section in accordance with the present invention.
Figure 15:
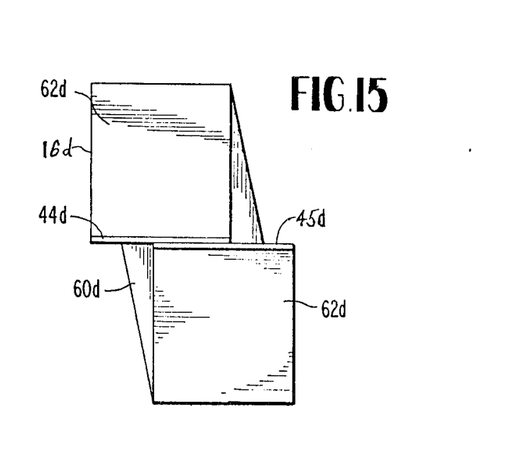
FIG. 15 is a top plan view of the endless drive section of FIG. 14.

FIGS. 14 and 15 depict an embodiment of endless drive section 16d slightly modified from that in FIGS. 11-13. Rather than second segment 44d and second portion 45d being offset from their respective sloping side surfaces 62d, the sloping side surfaces are offset from each other so that contact surface 60d is offset or angled.

Figure 16:
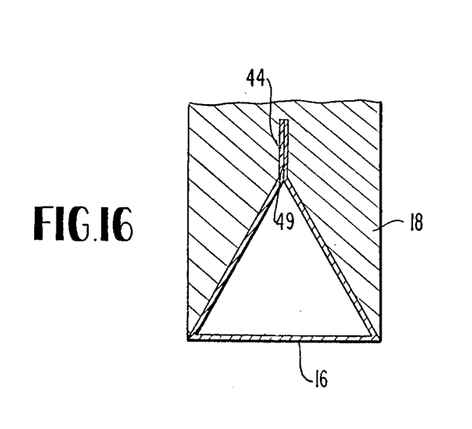
FIG. 16 is a broken sectional view illustrating details of construction of another embodiment of endless drive section in accordance with the present invention.

FIG. 16 illustrates any of the endless drive sections 16b-16d mating with wheel 18. A recess 49 is provided to receive second segments 44 and second portions 45.

Figure 17:
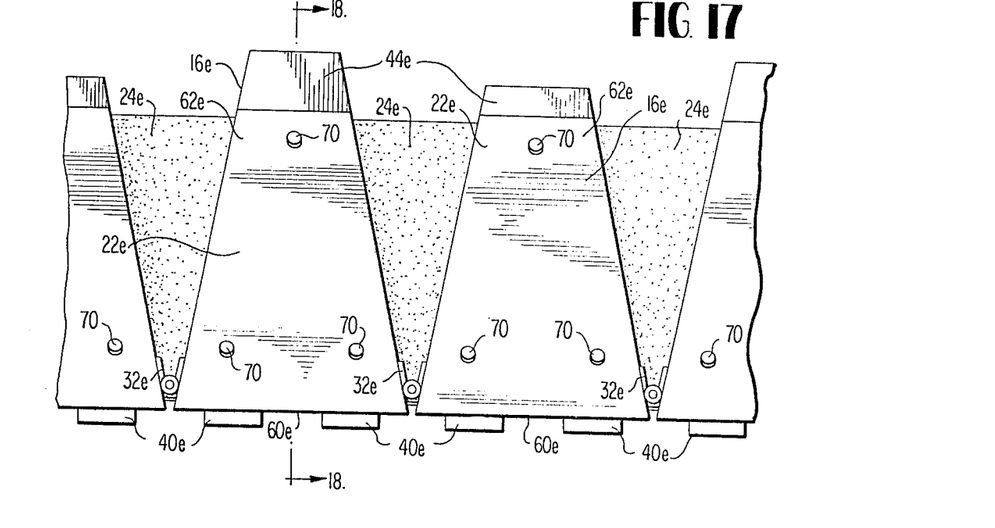
FIG. 17 is a fragmentary side elevational view depicting a further embodiment of endless drive section in accordance with the present invention
Figure 18:
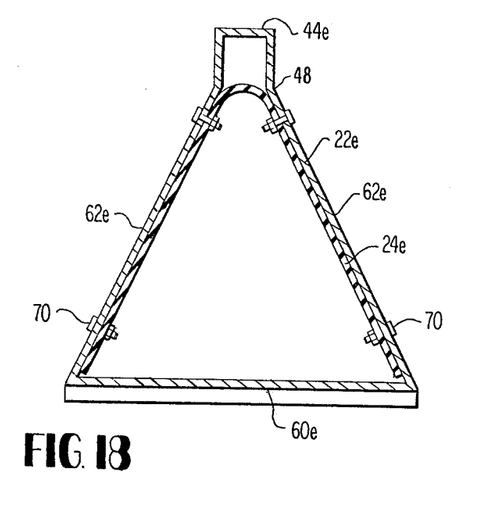
FIG. 18 is a sectional view taken along line 18—18 of FIG. 17.

FIGS. 17 and 18 depict a further embodiment of endless drive section 16e in accordance with the present invention. Each endless drive section 16e, includes a triangular body portion 22e with a contact surface 60e and first and second sloped side surfaces 62e. If endless drive sections 16e are to be used in an endless track vehicle drive system, treads 40e can be provided on contact surfaces 60e. Adjacent endless drive sections 16e are pivotally connected together by hinge members 32e fastened to the edges of sloped side surfaces 62e adjacent contact surface 60e. Mating portion 44e extends from the corner junction 48 opposite contact surface 60e. Shield portion 24e fits within each body portion 22e. Shield portion 24e is fastened to sloped side surfaces 62e by suitable means such as bolts 70. Shield portion 24e is formed of a heavy, tough, flexible material such as a rubber or a rubberized canvas. If desired a frame can be provided within each body portion 22e to support shield portion 24e therein, since shield portion 24e only needs to flex between body portions 22e.

The mating portions 44e of alternate endless drive sections 16e extend from their respective body portions 22e a greater distance than do the intervening mating portions 44e. By way of illustration, if body portions 22e have a height in the order of twelve inches and a length in the order of eight inches at contact surface 60e, the mating portions 44e of alternate endless drive sections 16e might extend in the order of about two inches from their body portions, while the intervening mating portions 44e might extend in the order of about one inch from their body portions. Each of the body portions 22e might have a length in the order of four inches at the corner junctions 48 of body portions 22e and mating portions 44e. The sloped side surfaces 62e of body portions 22e thus are tapered inwardly from contact surface 60e to mating portion 44e, and shield portion 24e extends between adjacent body portions 22e.

Figure 19:
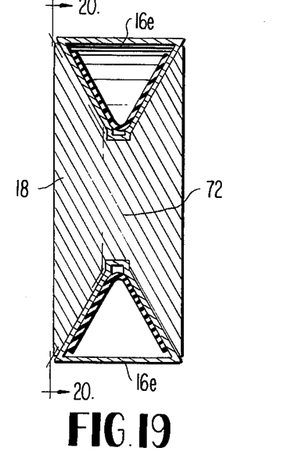
FIG. 19 is a sectional view illustrating the driving of the endless drive section of FIG. 17 and is taken along line 19—19 of FIG. 20.
Figure 20:
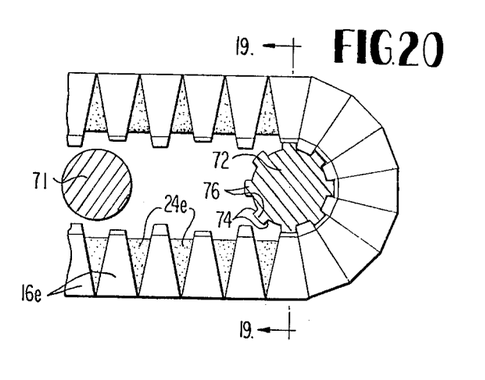
FIG. 20 is a fragmentary side sectional view taken along line 20—20 of FIG. 19.

FIGS. 19 and 20 depict operation of an endless drive system made up of endless drive sections 16e. Axle portion 71 is the axle of a non-drive wheel 18 while axle portion 72 is the axle of a drive or driven wheel 18. It may be preferred to have all wheels driven so that all axles are of the configuration of axle 72. As endless drive sections 16e pivot about hinge members 32e to rotate about axle 72, sloped side surfaces 62e of adjacent endless drive sections 16e close together, as depicted in FIG. 20. Shield portion 24e flex to permit this closing, and yet when adjacent endless drive sections 16e are aligned in a straight line, for example on a horizontal ground surface, shield portions 24e extend between adjacent sloped side surfaces to shield the interiors of body portions 22e from sand, dirt, mud, and other foreign objects. Axle 72 is grooved longitudinally on its surface, and the alternating long and short mating sections 44e mate with the gooves 74 and ridges 76 of axle 72 to drive the endless drive system or to drive axle 72, depending upon whether power is being applied from a source to axle 72 so that axle 72 drives the endless drive system or whether power is being applied from another source to the endless drive system to drive axle 72.

Figure 21:
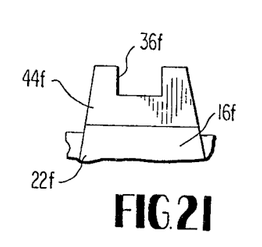
FIG. 21 is a fragmentary side elevational view illustrating another embodiment of endless drive section in accordance with the present invention.

FIG. 21 depicts a modification of the endless drive sections of FIGS. 17, 18 19, and 20 in which the mating portion 44f of each of the endless drive section 16f extends the same distance from the body portions 22f, and each mating portion 44f includes a groove 36f so that each mating portion 44f mates with grooves 74 and ridges 76 on axle 72. Preferably each groove 36f extends one-half the length of its mating portion 44f and is centrally located thereon so that the grooves 36f of sections 16f fittingly engage the ridges 76 of axle 72, permitting an endless drive system made up of sections 44f to be used interchangeably on the same axle 72 as an endless drive system made up of sections 44e.

Flexible shield portions 24e can be utilized with other embodiments of endless drive sections, if desired. Thus, for example, flexible shield portions 24e could be utilized with endless drive sections 16b of FIGS. 8, 9, and 10, with endless drive sections 16c of FIGS. 11, 12 and 13 or with endless drive sections 16d of FIGS. 14 and 15. Alternatively, the end surfaces 47 of these embodiments of endless drive section can be closed to prevent entry of dirt, or a shield portion such as shield portion 24 of FIGS. 2, 3 and 4 could be fashioned for these embodiments of endless drive sections. Likewise, the endless drive sections could be solid, eliminating the possibility of entry of dirt.

Figure 22:
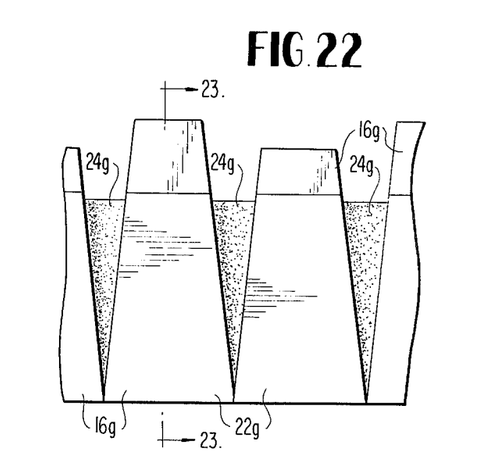
FIG. 22 is a fragmentary side elevational view depicting another embodiment of endless drive section in accordance with the present invention.
Figure 23:
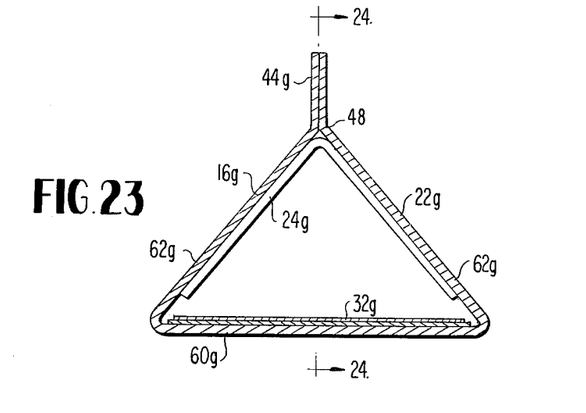
FIG. 23 is a sectional view taken along line 23—23 of FIG. 22.
Figure 24:
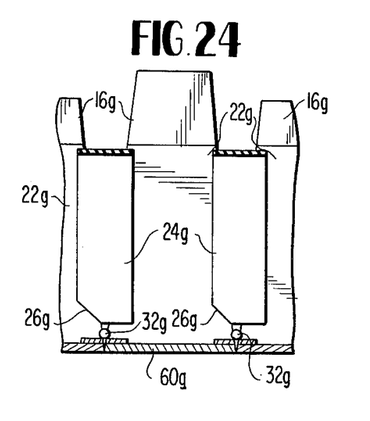
FIG. 24 is a sectional view taken along line 24—24 of FIG. 23.

FIGS. 22, 23, and 24 depict another embodiment of endless drive section 16g in accordance with the present invention, which is a slight variation on the endless drive section 16e of FIGS. 17 and 18. Each endless drive section 16g includes a triangular body portion 22g with a contact surface 60g and first and second sloped side surfaces 62g. Again, if desired, a tread surface can be provided on contact surfacess 60g. Adjacent endless drive sections 16g are pivotally connected together by hinge members 32g fastened to the inner side of contact surfaces 60g. Mating portion 44g extends from the corner junction 48 opposite contact surface 60g. Mating portion 44g can be formed of extensions of each of the sloping side surfaces 62g which extensions are welded or otherwise fastened together. Shield portions 24g extend between adjacent body portions 22g. In the illustrative showing of FIG. 24, each shield portion 24g is fixedly connected to the body portion 22g that is shown to the right of the respective shield portion 24g, and each shield portion 24g slidingly engages the body portion 22g that is shown to its left. Thus, when the endless drive sections 16g pivot to move about the axle of a drive wheel, such as axle 72 shown in FIG. 20, the shield portions 24g telescope into the slidingly engaged body portions 22g. The body portions 22g and the shield portions 24g can be made of a suitable rigid material such as steel. Preferably the lower corner 26g of each shield portion which is adjacent the slidably contacted body portion 22g is beveled to permit the desired pivoting, as illustrated in FIG. 24. The slidingly engaged edges of the body portions 22g can include wear surfaces to scrape dirt from the shield portions 24g as the drive sections 16g pivot about axle 72.

Figure 25:
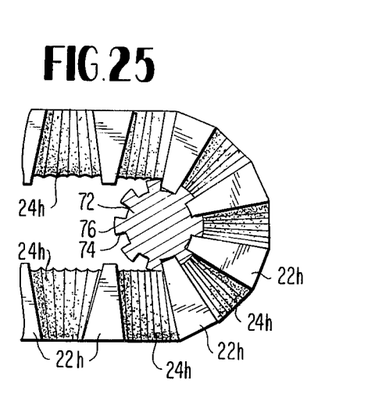
FIG. 25 is a fragmentary side elevational view depicting still another embodiment of endless drive section in accordance with the present invention.

FIG. 25 illustrates another embodiment of endless drive section in accordance with the present invention in which each body portion 22h is a solid body formed of a relatively rigid material such as a steel-corded rubber. The shield portions 24h between adjacent body portions 22h are a flexible, tough material and might also be a steel-corded rubber. Shield portions 24h are hollow and are formed with accordian folds so that, as the endless drive system pivots about axle 72, the accordian folds close together to compress the shield portions which then are adjacent the ridges 76 of axle 72, while the solid body portions 22h extend within the grooves 74 of axle 72. Alternatively, if desired, the entire endless drive system can be formed of a solid, steel-corded rubber having sufficient flexibility to permit curvature about axle 72.

Figure 26:
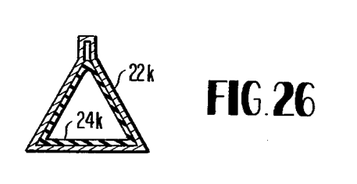
Figure 27:
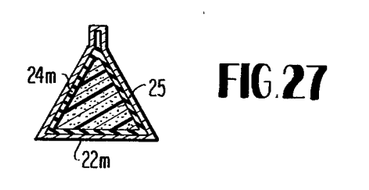

FIG. 26 depicts a further variation of the endless drive section of FIGS. 17 and 18 in accordance with the present invention. Shield portion 24k extends through each body portion 22k the entire length of the endless drive system, and shield portion 24k is fully enclosed. Shield portion 24k is filled with air or other suitable gas at a pressure slightly above atmospheric pressure to provide greater flotation of the vehicle and to assure that no dirt enters the endless drive system. Alternatively, each body portion 22k can have its own inflated shield portion 24k. In like manner, FIG. 27 depicts a further modified form of endless drive section in accordance with the present invention in which an enclosed shield portion 24m is provided within body portion 22m and is filled with foam or other suitable material 25. Both the gas-filled shield portion 24k of FIG. 26 and the foam-filled shield portion 24m of FIG. 27 must have sufficient flexibility to permit pivoting about axle 72.

Figure 28:
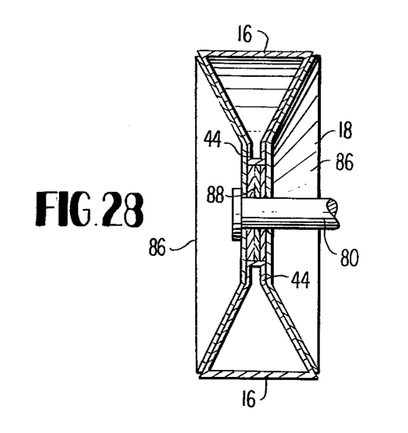
FIG. 28 is a sectional view depicting yet another embodiment of endless drive section in accordance with the present invention.
Figure 29:
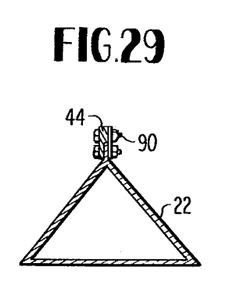

Wheels 18 need not be solid. FIG. 28 illustrates an embodiment of wheel 18 made up of two saucer-shaped members 86 positioned back-to-back with shims 88 between them to provide the proper spacing to fit about the mating portion 44 of the endless drive sections 16. Should wear cause looseness, shims 88 can be added, exchanged for other sizes, or removed, as necessary. Similarly, for ease of maintenance, the mating portions 44 can be bolted to the body portions 22, as illustrated in FIG. 29, with each wheel 18 having its groove 19 suitably shaped to receive both mating portion 44 and its bolts 90. Bolts 90 might also serve to drive the endless drive system.

Figure 30:
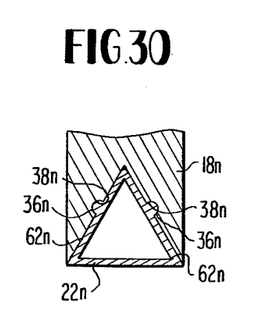

The endless drive system need not be driven at mating portions 44. FIG. 30 depicts an embodiment of endless drive section 22n having gear teeth or driving teeth 36n extending from sloped side surfaces 62n to mesh with mating gear teeth 38n of wheel 18n.

Figure 31:
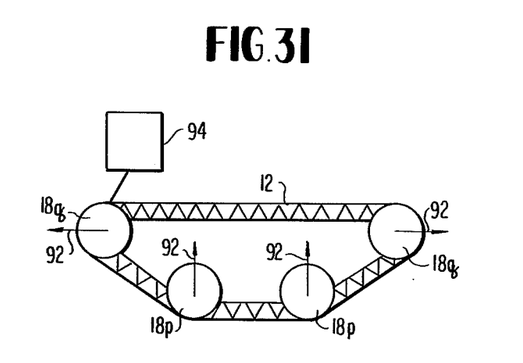
FIG. 31 is a side elevational view depicting another embodiment of endless drive system in accordance with the present invention.

The endless drive system 12 preferably has its several wheels 18 aligned horizontally to provide maximum surface contact on the ground, thereby increasing the flotation of a vehicle which the endless drive sections drive. To aid movement of the vehicle over obstacles, the wheels 18 can be controlled by a pneumatic or other control system 94 so that the interior wheels 18p are capable of vertical movement while the exterior wheels 18q are capable of horizontal movement to permit adjustment of the endless drive system 12 to an inclined orientation, as depicted in FIG. 31 so that the vehicle can more readily climb over obstacles. When the obstacles have been overcome and level terrain is again encountered, control system 94 is again actuated to move the wheels 18 in the directions shown by their respective arrows 92 in FIG. 31 to return the endless drive system 12 to the high flotation, substantially horizontal configuration.

The large interior wheels 18 illustrated on the endless drive system of the present invention result in a vehicle driven by the endless drive system having a relatively high ground clearance. Consequently, through-axles can be utilized on such a vehicle, permitting use of heavier springs and shock absorbers on the vehicle so that a smoother ride is obtained. Additionally, a quieter ride is achieved and high speeds can be obtained. The sloped configuration of side surfaces 62 distributes the weight of the load carried by endless drive system 12. Therefore, lower wear is experienced, particularly if wear surfaces, such as wear surface 42 in FIG. 7, are utilized. In addition, the relatively simple configuration permits use of alternative manufacturing techniques such as forging, stamping, and so forth, easing production of the endless drive system of present invention. The triangular or sloped configuration of the endless drive sections makes the endless drive system of the present invention substantially self-aligning. Any of the wheels 18 can be the drive wheel on a vehicle utilizing as its drive system an endless drive system in accordance with the present invention. Alternatively, an endless drive system in accordance with the present invention can be utilized on an endless track trailer, with no drive wheel. The drive of an endless drive system in accordance with the present invention can be by any suitable means including by way of examples the drive pin 36 of FIG. 7, the drive axle 72 of FIG. 20, the drive gears 36n of FIG. 30, and friction drive.

Figure 32:
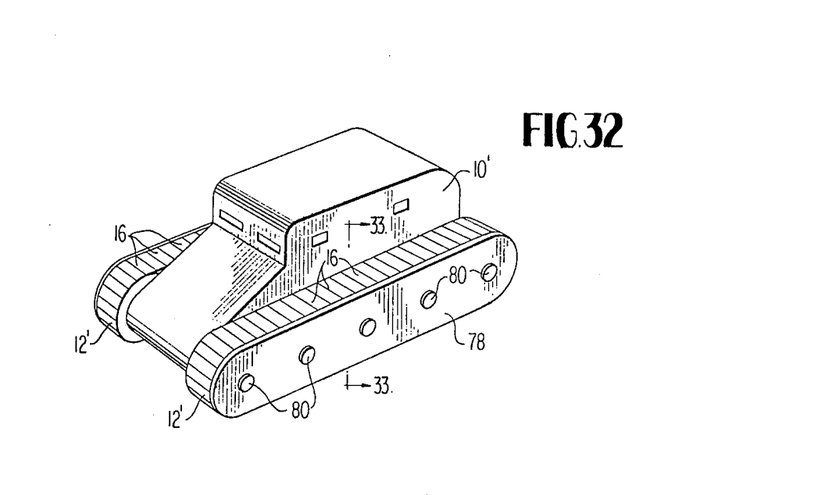
FIG. 32 is a perspective view of a vehicle incorporating another embodiment of endless drive system in accordance with the present invention.
Figures 33, 34, 35:
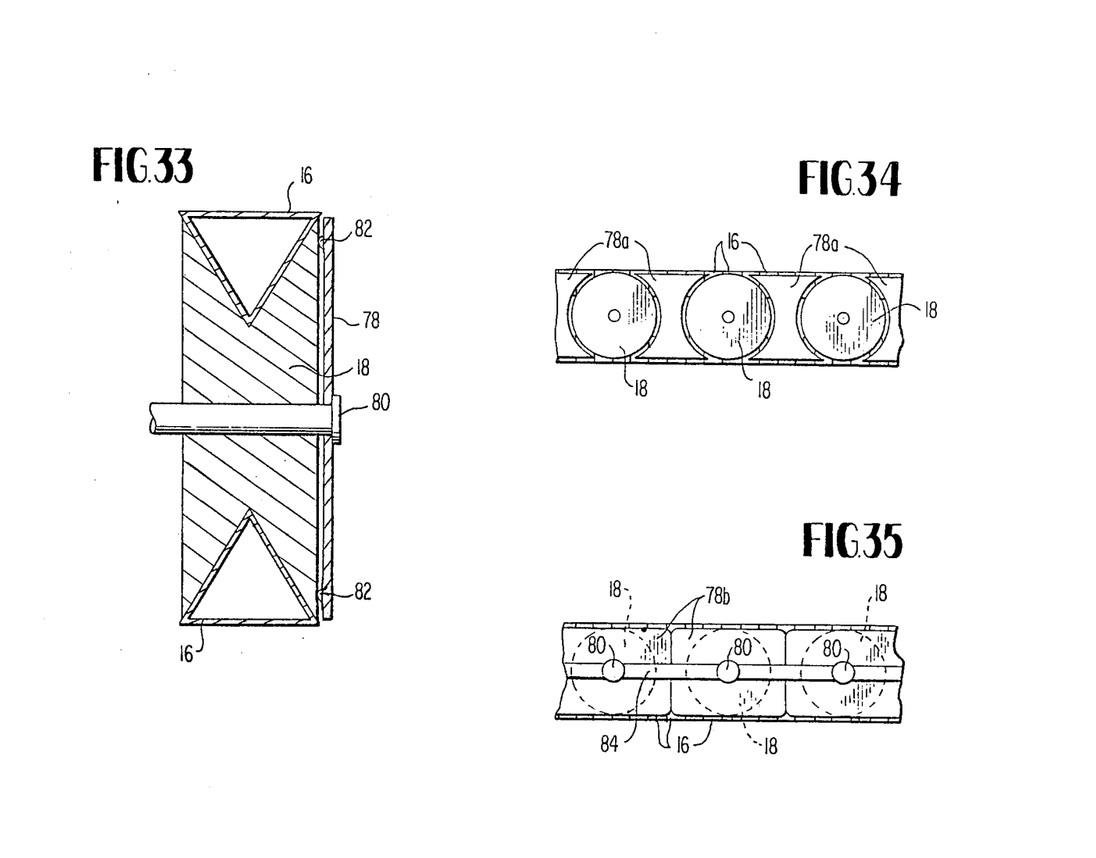
FIG. 33 is a sectional view taken along line 33—33 of FIG. 32.
FIG. 34 is a fragmentary elevational view depicting another embodiment of endless drive system in accordance with the present invention.
FIG. 35 is a fragmentary elevational view depicting still another embodiment of endless drive system in accordance with the present invention.

FIGS. 32 and 33 illustrate another embodiment of the present invention in which the endless drive system is shown as an endless track vehicle drive system 12' for an endless track vehicle 10' depicted illustratively as a military armored personnel carrier type of vehicle. The endless track vehicle drive system 12' might be made up of any of the several embodiments of endless drive sections 16 described above. An external shield member 78 is attached by means of axles 80 to overlie the outer surface of all of the wheels 18 on vehicle 10', thereby substantially enclosing the wheels 18 and the endless drive sections 16. Shield member 78 thus provides further assurance that dirt and other foreign objects cannot get within the endless drive system. If desired, a roller 82 can be provided adjacent each edge of shield member 78 at each wheel 18, as depicted in FIG. 33, to providing rolling contact between shield member 78 and the wheels 18.

FIG. 34 illustrates a variation in which the external shield is made up of shield sections 78a which fit between adjacent wheels 18. The slight spacing between each shield section 78a and its adjacent wheels 18 permits flexing to conform to the ground surface. FIG. 35 depicts a further variation in which a shield section 78b overlies each wheel 18, with the several shield sections 78b extending between adjacent wheels 18 to substantially enclose the wheels and the endless drive sections, while permitting flexing. Shield sections 78b are connected to member 84 which attaches to axles 80 to hold the shield sections in place. Again, rollers 82 can be provided on the inner surface of each shield section 78b, if desired.

As can be appreciated from, for example, FIG. 20, an endless drive system made up of any of the endless drive sections of the present invention can be used in any of several types of applications. Thus, the endless drive sections can be utilized in an endless track vehicle drive system for a vehicle such as tractor 10 of FIG. 1, in which case contact surface 60 is a ground contacting surface. Alternatively, any of the endless drive sections can be used in an endless drive, having both a driving wheel and a driven wheel. In addition, any of the endless drive sections can be used in an endless belt, for example for conveying goods between locations, in which case contact surface 60 is a carrying surface.

It is thus seen that in accordance with the present invention, an improved endless drive system is provided suitable for numerous uses including use as an endless track vehicle drive system to permit operation of a vehicle on ground surfaces including soft ground surfaces such as sand surfaces, while reducing the likelihood that dirt and other foreign objects can get into the endless drive system. The endless drive system of the present invention eliminates numerous components from conventional endless drive systems. Although the present invention has been described with reference to preferred embodiments, numerous rearrangements and alterations could be made, and still the result would be within the scope of the invention.

What is claimed is:
1. An endless drive system comprising:
   a plurality of endless drive sections, each section including a substantially closed contact surface and inwardly sloped, substantially closed side surfaces extending from first and second sides of said contact surface toward the center of the endless drive system and forming therewith a body portion having a substantially closed periphery;
   connecting means for pivotally connecting the portions of said endless drive sections adjacent the center of the drive system to enable movement of said endless drive system in an endless path; and
   shield means extending from each body portion and overlapping an adjacent endless drive section for maintaining a substantially closed structure between adjacent endless drive sections as said endless drive system travels in an endless path.

2. An endless drive system as claimed in claim 1 in which non-adjacent endless drive sections extend from said contact surface a first distance and intervening ones of said endless drive sections extend from said contact surface a second distance less than the first distance.

3. An endless drive system as claimed in claim 2 further comprising a wheel about which said endless drive system travels in an endless path, the periphery of said wheel being indented different depths for fittingly engaging said non-adjacent and intervening ones of said drive sections as they travel in said endless path.

4. An endless drive system as claimed in claim 1 further comprising:
   a plurality of wheels, said endless drive sections being connected about said plurality of wheels; and
   control means for controlling the relative positioning of said plurality of wheels to permit alteration of the alignment thereof.

5. An endless drive system as claimed in claim 4 in which
   said plurality of wheels include first and second end wheels and at least one wheel intermediate said end wheels; and
   said control means includes means for adjusting the longitudinal spacing of said end wheels and the vertical position of said intermediate wheel.

6. An endless drive system as claimed in claim 1 in which the body portion has a recess in the surface thereof opposite the closed contact surface for receiving a drive pin from a drive wheel.

7. An endless drive system as claimed in claim 1 in which the body portion includes a drive pin extending from the surface thereof opposite the closed contact surface for insertion into a recess in a drive wheel.

8. An endless drive system as claimed in claim 7 further comprising a plurality of wheels at least one of which is a drive wheel, each wheel having a peripheral surface notched at an angle to mate with the sloped side surfaces of the endless drive sections, the notch of at least said drive wheel including a recess to receive an endless drive section drive pin.

9. An endless drive system as claimed in claim 1 in which each body portion includes a triangular segment, made up of the closed contact surface and the sloped side surfaces, and a second segment extending from the corner junction of the triangular segment opposite the closed contact surface.

10. An endless drive system as claimed in claim 9 in which the second segments of alternate ones of said endless drive sections extend from said triangular segment a first distance, and the second segments of the intervening ones of said endless drive sections extend from the triangular segments a second distance less than the first distance.

11. An endless drive system as claimed in claim 10 further comprising a wheel about which said endless drive system travels in an endless path, the periphery of said wheel being indented different depths for fittingly engaging said alternate and intervening ones of said second segments as said endless drive system travels in the endless path.

12. An endless drive system as claimed in claim 1 in which said shield means comprises a plurality of rigid shield means, each rigid shield means connected to one of said endless drive sections and telescopingly engaging an adjacent endless drive section.

13. An endless drive system as claimed in claim 1 further comprising drive means extending from at least one of said sloped side surfaces.

14. An endless drive system comprising:
a plurality of endless drive sections each including a substantially closed contact surface having an axis and each further including first and second substantially closed, sloped side surfaces extending from first and second sides of said contact surface to form a body portion, said first and second sides being substantially parallel with said axis;
a plurality of fastening means for pivotally connecting said plurality of endless drive sections for movement in a direction of travel as an endless drive system, with each endless drive section axis substantially parallel to said direction of travel;
shield means for preventing entry of foreign objects into said endless drive system, said shield means extending between adjacent endless drive sections and within each body portion adjacent said sloped side surfaces for shielding the interiors of said body portions from entry of foreign objects; and in which
each body portion has a connection hole through each of the two sloped side surfaces thereof;
each shield means comprises a shield portion extending from an associated body portion and having a substantially triangular cross-section with a connection hole passing through each of the two sloping surfaces thereof and adapted for mating with the body portion of an adjacent endless drive section to align the connection hole of the shield portion with the connection hole of the adjacent endless drive section body portion; and
each fastening means passes through the connection hole of an endless drive section body portion and the connection hole of an adjacent endless drive section shield portion to pivotally connect the plurality of endless drive sections in an endless drive system.

15. An endless drive system as claimed in claim 14 in which the body portion is a hollow triangular portion having the closed contact surface and the first and second sloped side surfaces and having an outer triangular cross-section and an inner triangular cross-section and in which the shield portion has a triangular cross-section substantially the same as the body portion inner triangular cross-section to permit insertion of the shield portion within the body portion of the adjacent drive section.

16. An endless drive system as claimed in claim 15 in which the shield portion has a first end extending from the body portion and a second closed end.

17. An endless drive system as claimed in claim 14 further comprising a plurality of wheels at least one of which is a drive wheel, each wheel having its peripheral surface notched at an angle to mate with the sloped side surfaces of the endless drive sections, said endless drive sections being connected about said plurality of wheels.

18. An endless drive system as claimed in claim 17 in which each of said wheels is formed of two saucer-shaped members positioned back-to-back, shim means for conrolling the spacing between said saucer-shaped members, and fastening means for fastening said saucer-shaped members and said shim means together as a wheel.

19. An endless drive system as claimed in claim 17 in which the peripheral surface notch of each wheel includes a removable wear surface.

20. An endless drive system as claimed in claim 17 further comprising at least one drive pin extending from the notch of said drive wheel and in which the body portion of at least some of said endless drive sections has a recess in the surface thereof opposite said closed contact surface for receiving said drive pin.

21. An endless drive system as claimed in claim 17 in which the notch of said drive wheel has a plurality of recesses therein and in which the body portion of at least some of said endless drive sections has a drive pin extending from the surface thereof opposite said closed contact surface for insertion into one of the recesses of said drive wheel notch.

22. An endless drive system comprising:
a plurality of endless drive sections, each endless drive section including a substantially closed contact surface having an axis and first and second substantially closed, sloped side surfaces extending inwardly of first and second sides of said contact surface to form a body portion, each body portion having a connecting hole passing therethrough, each endless drive section further including a second portion extending from the body portion and having a connection hole passing therethrough and adapted for mating with the body portion connection hole of an adjacent endless drive section to align the connection hole of the second portion with the connection hole of the adjacent endless drive section body portion;
a plurality of fastening means, one fastening means passing through the connection hole of each endless drive section body portion and the connection hole of the adjacent endless drive section second portion, to pivotally connect the plurality of endless drive sections in an endless drive system for movement in a direction of travel with each endless drive section axis substantially parallel to said direction of travel; and
shield means for preventing entry of foreign objects into said endless drive system.

23. An endless belt system as claimed in claim 22 in which the body portions include a triangular segment having the closed contact surface and the first and second sloped side surfaces, and a second segment extending from the corner junction of the triangular segment opposite the closed contact surface, the second segment having the body portion connection hole passing therethrough and having a recess therein adjacent the body portion connection hole and adapted to receive the second portion of an adjacent belt section, and in which the second portion extends from the second segment opposite the recess thereof for insertion into the body portion second segment recess of an adjacent endless belt section.

24. An endless belt system as claimed in claim 22 in which the body portions include a triangular segment having the closed contact surface and the first and second sloped side surfaces, and a second segment extending and offset from one sloped side surface at the corner junction of the triangular segment opposite the closed contact surface, the second portion extending and offset from the other sloped side surface at the corner junction of the triangular segment opposite the closed contact surface, the offsets of the second portion and of the second segment being in opposite directions to permit the second portion of an endless belt section to overlay the second segment of an adjacent endless belt section.

25. An endless belt system as claimed in claim 22 in which the body portions include a triangular segment having the closed contact surface and the first and second sloped side surfaces, and a second segment extending from one sloped side surface at the corner junction of the triangular segment opposite the closed contact surface, the second portion extending from the other sloped side surface at the corner junction of the triangular segment opposite the closed contact surface, the second portion and the second segment being offset in opposite directions, with the closed contact surface angled to permit the second portion of an endless belt section to overlay the second segment of an adjacent endless belt section.

26. An endless belt system comprising a plurality of belt sections including an outer, substantially closed surface and substantially closed sides extending inwardly of first and second sides of said outer surface and forming therewith at least part of a body portion having a substantially closed periphery, connecting means for pivotally connecting said belt sections in said belt system to enable movement of said belt system in an endless path during portions of which said adjacent belt sections move apart, and flexible shield means extending between and attached to adjacent belt sections for maintaining a substantially closed structure between adjacent belt sections when said sections move apart as said belt system travels in an endless path.

27. An endless belt system comprising:
a plurality of endless belt sections including a substantially closed, outer contact surface having an axis and further including first and second substantially closed side surfaces extending inwardly of first and second sides of said contact surface to form at least a portion of a body portion, said first and second sides being substantially parallel with said axis;
a plurality of fastening means for pivotally connecting said plurality of endless belt sections for movement in a direction of travel as an endless belt system, with the axis of said endless belt sections being substantially parallel to said direction of travel; and
gas-filled, flexible shield means for preventing entry of foreign objects into said endless belt system.

28. An endless belt system comprising:
a plurality of endless belt sections including a substantially closed, outer contact surface having an axis and further including first and second substantially closed side surfaces extending inwardly of first and second sides of said contact surface to form at least a portion of a body portion, said first and second sides being substantially parallel with said axis;
a plurality of fastening means for pivotally connecting said plurality of endless belt sections for movement in a direction of travel as an endless belt system, with the axis of said endless belt sections being substantially parallel to said direction of travel; and
resilient foam-filled shield means for preventing entry of foreign objects into said endless belt system.

29. An endless belt system comprising:
a plurality of endless belt sections including a substantially closed, outer contact surface having an axis and further including first and second substantially closed side surfaces extending inwardly of first and second sides of said contact surface to form at least a portion of a body portion, said first and second sides being substantially parallel with said axis;
a plurality of fastening means for pivotally connecting said plurality of endless belt sections for movement in a direction of travel as an endless belt system, with the axis of said endless belt sections being substantially parallel to said direction of travel; and
accordion fold shield means for preventing entry of foreign objects into said endless belt system and cooperating with said fastening means to permit pivoting of said endless belt system as it moves in an endless path.

30. An endless belt system comprising:
a plurality of endless belt sections each including a substantially closed, outer contact surface having an axis and further including first and second substantially closed side surfaces extending inwardly of first and second sides of said contact surface to form a body portion, said first and second sides being substantially parallel with said axis; each of said endless drive sections further including a second portion extending from the surface of the associated body portion opposite the closed contact surface;
fastening means enclosed within said endless drive sections for pivotally connecting said plurality of endless belt sections for movement in a direction of travel as an endless belt system, with the axis of said endless belt sections being substantially parallel to said direction of travel; and
shield means for preventing entry of foreign objects into said endless belt system.

31. An endless track system for a vehicle comprising:
(a) a plurality of vehicle track sections, each comprising:
  (1) a substantially triangular portion having a ground contacting surface and two sloping surfaces, the substantially triangular portion having a connection hole passing therethrough, the substantially triangular portion being adapted to mate with the second portion of an adjacent vehicle track section; and
  (2) a second portion extending from the substantially triangular portion and having a connection hole passing therethrough, the second portion adapted for mating with the substantially triangular portion of an adjacent vehicle track section to align the connection hole of the second portion with the connection hole of the adjacent track section substantially triangular portion; and
(b) a plurality of fastening means, each fastening means passing through the connection hole of a track section substantially triangular portion and the connection hole of the adjacent track section second portion to rotatably connect the plurality of track sections in an endless track.

32. An endless track system as claimed in claim 31 in which the substantially triangular portion connection hole passes through the two sloping surfaces and in which the second portion has a substantially triangular cross-section.

33. An endless track system as claimed in claim 32 in which the substantially triangular portion is a hollow triangular portion having an outer triangular cross-section and an inner triangular cross-section and in which the second portion has a triangular cross-section substantially the same as the substantially triangular portion inner triangular cross-section to permit insertion of the second portion within the substantially triangular portion of the adjacent vehicle track section.

34. An endless track system as claimed in claim 33 in which the second portion has a first end extending from the substantially triangular portion and a second closed end.

35. An endless track system as claimed in claim 31 in which the substantially triangular portion includes a first triangular segment and a second segment extending from the corner surface of the triangular segment opposite the ground contacting surface, the second segment having the substantially triangular portion connection hole passing therethrough and having a recess therein adjacent the substantially triangular portion connection hole and adapted to receive the second portion of an adjacent vehicle track section, and in which the second portion extends from the second segment opposite the recess thereof for insertion into the substantially triangular portion second segment recess of an adjacent vehicle track section.

36. An endless track system as claimed in claim 31 in which the substantially triangular portion includes a first triangular segment and a second segment extending and offset from one sloping surface at the corner surface of the triangular segment opposite the ground contacting surface, the second portion extending and offset from the other sloping surface at the corner surface of the triangular segment opposite the ground contacting surface, the offsets of the second portion and of the second segment being in opposite directions to permit the second portion of a vehicle track section to overlay the second segment of the adjacent track section.

37. An endless track system as claimed in claim 31 in which the substantially triangular portion includes a first triangular segment and a second segment extending from one sloping surface at the corner surface of the triangular segment opposite the ground contacting surface, the second portion extending from the other sloping surface at the corner surface of the triangular segment opposite the ground contacting surface, the second portion and the second segment being offset in opposite directions with the ground contacting surface angled to permit the second portion of a vehicle track section to overlay the second segment of the adjacent vehicle track section.

38. An endless track system as claimed in claim 31 in which the substantially triangular portion includes a drive pin extending from the surface thereof opposite the ground engaging surface for insertion into a recess in a vehicle drive wheel.

39. An endless track system as claimed in claim 38 further comprising a plurality of wheels, at least one of which is a drive wheel, each wheel having a peripheral surface notched at an angle to mate with the sloping surfaces of the vehicle track sections, the notch including a recess to receive a vehicle track section drive pin.

40. An endless track system as claimed in claim 39 in which the ground contacting surface includes a tread surface.

41. An endless track system as claimed in claim 31 in which the substantially triangular portion surface opposite the ground engaging surface has a recess therein for receiving a drive pin from a vehicle drive wheel.

42. An endless track system as claimed in claim 31 in which the ground contacting surface includes a tread surface.

43. An endless track system as claimed in claim 42 in which the tread surface is a cleated surface.

44. An endless track system as claimed in claim 31 further comprising a plurality of wheels at least one of which is a drive wheel, each wheel having a peripheral surface notched at an angle to mate with the sloping surfaces of the vehicle track sections.

45. An endless track system as claimed in claim 41 in which the wheel peripheral surface notch includes a recess to receive the second portion.

46. An endless track system as claimed in claim 44 in which the wheel peripheral surface notch includes a removable wear surface.

47. An endless track system as claimed in claim 31 in which the ground contacting surface is cleated.

48. An endless drive system comprising:
a plurality of endless drive sections including a substantially closed, outer contact surface having an axis and further including first and second substantially closed side surfaces extending inwardly from first and second sides of said contact surface to form a body portion, said first and second sides being substantially parallel with said axis;
a plurality of fastening means for pivotally connecting said plurality of endless drive sections for movement in a direction of travel as an endless drive system, with the axis of said endless drive sections being substantially parallel to said direction of travel;
a plurality of wheels over which said connected endless drive sections move; and
shield means for preventing entry of foreign objects into said endless drive system, said shield means comprising a plurality of shield sections overlying respective ones of said plurality of wheels, said shield sections extending between said wheels to substantially cover the side of said wheels and the side of said endless drive sections.

49. An endless drive system as claimed in claim 48 further comprising roller means connected to a plurality of said shield sections and adjacent said wheels for providing rolling contact between said shield sections and said wheels.

50. An endless drive comprising:
a plurality of endless drive sections having a substantially closed, outer contact surface having an axis and further including first and second substantially closed sides extending inwardly from first and second sides of said contact surface to form a body portion, said first and second sides being substantially parallel with said axis;
a plurality of fastening means for pivotally connecting said plurality of endless drive sections for movement in a direction of travel as an endless drive system, with the axis of said endless drive sections being substantially parallel to said direction of travel;
a plurality of wheels over which said connected endless drive sections move;
shield means for preventing entry of foreign objects into said endless drive systems; and
roller means connected to said shield means and adjacent said wheels for providing rolling contact between said shield means and said wheels.

* * * * *